Patented Dec. 3, 1929

1,738,141

UNITED STATES PATENT OFFICE

NICHOLAS L. ETTEN, OF CHICAGO, ILLINOIS, ASSIGNOR TO CHARLES F. NOFTZGER, OF CHICAGO, ILLINOIS

ELECTRICAL RESISTANCE UNIT AND METHOD OF MANUFACTURING SAME

No Drawing.    Application filed August 11, 1928. Serial No. 299,130.

The main object of this invention is to provide an electrical resistance unit which is highly efficient as a resistance unit, well adapted for use as an electrical heating unit, is very economical to produce, is not subject to corrosion and may be made in substantially any desired size or shape of unit.

A further object is to provide a method of making electrical resistance units of the above indicated character or having the above indicated advantages.

In the manufacture of my improved electrical resistance units, I employ a mineral which so far as I am aware is found only near Buckeye, Arizona which, however, may be generally described as a sericite schist. While different analyses of this material vary somewhat the approximate composition thereof is as follows: silicum dioxide 46%; aluminum oxide 40%; potassium oxide 8%; calcium oxide 1¾%; sodium oxide 1½%; iron oxide ¾ of 1% and magnesium oxide ½ of 1%.

This mineral I grind or crush or otherwise reduce to a powdered or pulverulent condition and combine the same with iron by hydrogen, preferably in the proportion of two parts of the pulverulent sericite schist with one part of the iron by hydrogen, these ingredients being intimately mixed.

This mixture I combine or mix with a binder, preferably a phenol formaldehyde resin, in the proportion of about one part, I having found that a resistance element formed by the proportions of about 60% pulverulent sericite schist, 30% of the pulverulent iron by hydrogen and 10% of the resin is adapted for a very great variety of uses as a heating element and in other relations as an electrical resistance unit.

The mixture is molded to the desired form under pressure, preferably a pressure of approximately ten tons per square inch and subjected, while under this molding pressure, to a heat of approximately 350° Fahr. The molded units are then raised to a temperature of approximately 1200° Fahr. in an open oven or retort.

These resistance units are, as stated, highly desirable for numerous uses. They are economical to produce and retain their form under high temperatures. The units are capable of resisting quite heavy pressures and after the secondary heating described remain substantially fixed or unchanged when reheated, either when a current is passed therethrough or by the application of external heat.

Having thus described my invention, what I claim as new and desire to secure by Letters Patent, is:

1. An electrical resistance unit comprising a mixture of pulverulent sericite schist, pulverulent iron by hydrogen and a phenol formaldehyde resin binder.

2. An electrical resistance unit comprising a mixture of pulverulent sericite schist, pulverulent iron, and a binder, the proportions of the sericite schist being substantially greater than that of the pulverulent iron.

3. An electrical resistance comprising a mixture of cominuted schist, pulverulent iron, and a binder molded under pressure into a unit retaining its form when subjected to a high temperature.

4. The method of making an electrical resistance unit consisting of mixing pulverulent sericite schist, pulverulent iron by hydrogen and phenol formaldehyde resin in approximately the proportions of 60% of the pulverulent sericite schist, 30% of the pulverulent iron by hydrogen and 10% of the phenol formaldehyde resin, molding to form under a pressure of approximately ten tons per square inch, heating to approximately 350° Fahr. while under such molding pressure, removing from the mold, and heating to a temperature of approximately 1200° Fahr. in an open furnace or retort.

5. The method of making an electrical resistance unit consisting of mixing pulverulent sericite schist, pulverulent iron by hydrogen and phenol formaldehyde resin in approximately the proportions of 60% of the pulverulent sericite schist, 30% of the pulverulent iron by hydrogen and 10% of the phenol formaldehyde resin, molding to form under a pressure, and heating while under such molding pressure.

6. The method of making an electrical resistance unit consisting of combining pulverulent sericite schist, pulverulent iron by hydrogen and a binder in approximately the proportions of two parts of the pulverulent sericite schist to one part of iron by hydrogen, molding to form under pressure, subjecting to heat while under such pressure, and thereafter heating to a temperature substantially greater than the temperature under pressure.

7. The method of making an electrical resistance unit consisting of combining pulverulent sericite schist, pulverulent iron by hydrogen and a binder in approximately the proportions of two parts of the pulverulent sericite schist to one part of iron by hydrogen, and molding to form under pressure.

8. The method of making an electrical resistance unit consisting of mixing pulverulent sericite schist with pulverulent iron and a binder, molding to form under pressure, heating while under molding pressure, and heating the molded unit.

9. The method of making an electrical resistance unit consisting of mixing a pulverulent sericite schist and pulverulent iron by hydrogen in proportions of approximately two parts of the schist to one part of the iron by hydrogen together with a binder, and molding under pressure into a form retaining body of desired shape.

10. The method of making an electrical resistance unit consisting of mixing pulverulent sericite schist and pulverulent iron in proportions of approximately two parts of the schist to one part of the iron together with a binder, and molding under pressure into a form retaining body of desired shape.

In witness whereof I have hereunto set my hand.

NICHOLAS L. ETTEN.